United States Patent [19]

Chou

[11] Patent Number: 5,700,890
[45] Date of Patent: Dec. 23, 1997

[54] NEW IONOMERS BASED ON COPOLYMERS OF ETHYLENE WITH BOTH MONO-AND DICARBOXYLIC ACIDS

[75] Inventor: Richard Tien-Hua Chou, Wilmington, Del.

[73] Assignee: E. I. Du Pont de Nemours and Company, Wilmington, Del.

[21] Appl. No.: 807,943

[22] Filed: Feb. 28, 1997

Related U.S. Application Data

[63] Continuation-in-part of Ser. No. 780,372, Jan. 9, 1997, which is a continuation-in-part of Ser. No. 620,188, Mar. 22, 1996, abandoned.

[51] Int. Cl.$^6$ .................................................. E08F 222/06
[52] U.S. Cl. ........................ 526/272; 526/266; 526/271; 526/318.4; 526/318.6; 526/348.8
[58] Field of Search ................................. 526/318.6, 272, 526/348.8

[56] References Cited

U.S. PATENT DOCUMENTS

| | | |
|---|---|---|
| 3,264,272 | 8/1966 | Rees . |
| 3,904,588 | 9/1975 | Greene . |
| 4,351,931 | 9/1982 | Armitage ............................. 526/227 |
| 4,690,981 | 9/1987 | Statz ................................. 525/329.6 |
| 5,276,135 | 1/1994 | Powell ................................ 528/483 |

OTHER PUBLICATIONS

R. W. Rees, Chapter 10A—"Ionomeric Thermoplastic Elastomers Early Research—Surlyn® and Related Polymers", *Thermoplastic Elastomers—A Comprehensive Review*, ed. N. Legge et al., Publ. hanser 1987.

*Primary Examiner*—Fred Zitomer

[57] ABSTRACT

New ethylene/acid copolymer ionomers which contain both (meth)acrylic acid and certain dicarboxylic acid monomers are described. The polymers may be melt processed as readily as ethylene/(meth)acrylic acid dipolymer ionomers, in contrast to ethylene/acid copolymer ionomers containing only dicarboxylic acid monomer derived in-chain acid units. Polymers with typical levels of (meth)acrylic acid and low levels of diacid provide ionomers comparable to existing ionomers, but which have adhesive and polymer blend compatibilizing characteristics, while polymers with higher levels of diacid will exhibit properties which depend on in-chain diacid derived units.

5 Claims, No Drawings

NEW IONOMERS BASED ON COPOLYMERS OF ETHYLENE WITH BOTH MONO-AND DICARBOXYLIC ACIDS

CROSS REFERENCE TO RELATED APPLICATION

This Application is a Continuation-in-Part of application Ser. No. 08/780,372 filed Jan. 9, 1997, which is a File Wrapper Procedure, Continuation-in-Part of application of Ser. No. 08/620,188 filed Mar. 22, 1996, now abandoned.

BACKGROUND OF THE INVENTION

1. Field of the Invention

This invention relates to ionomers which are partially neutralized metal salts of ethylene/carboxylic acid copolymers which have copolymerized comonomer units of both certain monocarboxylic acids and certain dicarboxylic acids or their derivatives. The new ionomers have many useful superior properties compared with existing conventional ionomers.

2. Description of Related Art

Copolymers which are dipolymers of ethylene and the unsaturated monocarboxylic acids methacrylic or acrylic acid only, are well known. Commercially such dipolymers typically contain at least about 75 weight percent and up to about 92 weight percent ethylene. They are used for molding, packaging and some adhesive applications. Examples of such ethylene/acid copolymers include those sold under the trade name, Nucrel®, which are produced by E. I. du Pont de Nemours and Company. Such ethylene/acid copolymers are disclosed in U.S. Pat. No. 4,351,931 (Armitage), the parent disclosure of which was filed in June 1961.

Acid copolymers of this type, having monocarboxylic acid comonomers are also used to prepare ionomers, wherein the carboxylic acid units of the copolymers are partially neutralized with metal ions. Such 'ionomers' are sold by E. I. du Pont de Nemours and Company under the trade name Surlyn®. These resins are thermoplastic in the melt. Partial neutralization is used because fully neutralized acid copolymers are known to, and are disclosed as having, intractable melts. Ionomers have separate utility and significantly different properties from the un-neutralized ethylene/carboxylic acid copolymer 'precursors'. Ionomers were first disclosed in U.S. Pat. No. 3,264,272 (Rees). The ions form 'ionic crosslink' bonds at low temperatures, but are sufficiently labile at melt temperatures, provided there remain some un-neutralized carboxylic acid groups, that they allow typical thermoplastic melt processability.

The above Armitage patent does not disclose use of acid comonomers other than acrylic and methacrylic acid, and in practice these monocarboxylic acids are the only commercially important acid comonomers in ethylene/carboxylic acid copolymers as well as in the derived metal ion-neutralized ionomers. However, other acid comonomers which polymerize with ethylene, and the resulting copolymers have been disclosed; for example, in the above-mentioned Rees patent. In this patent, copolymers containing 0.2 to 25 mole percent of dicarboxylic acid comonomers such as itaconic, maleic, fumaric acids, their monoalkyl esters such as methyl hydrogen maleate, and anhydrides such as maleic anhydride are disclosed. Copolymers containing ethylene and 6 weight percent itaconic acid, and copolymers with 6 weight percent maleic anhydride are exemplified as are ionomers derived therefrom. The disclosure gives examples of ethylene/dicarboxylic acid dipolymers neutralized with mono- and divalent metals. In the case of monovalent metal ions, melt flow of partially neutralized copolymers is disclosed as being very low and, with divalent metal ions, flow is zero in several instances. While the degree of neutralization is not specifically stated in that disclosure, the inference is that, unlike ethylene/monocarboxylic acid ionomers, those of dicarboxylic acid copolymers are intractable, or very nearly so.

The Rees disclosure indicates that the intractable nature of ionomers of ethylene/dicarboxylic acids and divalent metal ions is believed to be because the ionic bonds are so strong that, 'they act like regular cross-linked polyolefins'. In a review of ionomers by R. W. Rees, Chapter 10A—Ionomers Thermoplastic Elastomers, Early Research—Surlyn® and Related Polymers—in 'Thermoplastic Elastomers—A Comprehensive Review', ed. N. Legge et al. Publ. Hanser 1987, data are provided, and it is stated that neutralization of dipolymers of ethylene and dicarboxylic acids gives low flow materials with monvalent sodium ions and with divalent ions such as zinc and strontium, the flow is zero. The degree of neutralization is not specifically stated. The reference also suggests that ethylene/dicarboxylic acid copolymer ionomers are not outstanding in any way compared with monocarboxylic acid copolymer ionomers.

No acid copolymers, or their derived ionomers, which are terpolymers (or even higher comonomer copolymers) having both monocarboxylic acid and dicarboxylic acid comonomers (or their derivatives) are specifically disclosed in Rees. Terpolymers with non-acid termonomers such as alkyl acrylates and methacrylates and their derived ionomers are, however, disclosed. Later, ionomers of this type, specifically, partially neutralized terpolymers of ethylene, methacrylic acid and n-butyl or iso-butyl acrylate were commercialized and are also available under the trade name Surlyn®. These terpolymer ionomers are commonly referred to as 'soft' ionomers, and the dipolymer ionomers, without 'softening' acrylate termonomers, as 'hard' ionomers.

Terpolymers of ethylene with between about 50 and 65 weight percent methyl acrylate and a low level of an alkyl monoester of maleic acid, cross-linked with a crosslinking agent which acts on the half ester, is cured with the agent to produce an elastomer, sold under the trade name Vamac® by E. I. du Pont de Nemours and Company. In this case the crosslinking cure typically produces covalent bond crosslinks. Such cured (cross-linked) resins are elastomeric but not melt processible. Such terpolymers and cross-linked elastomers derived from them are described in U.S. Pat. No. 3,904,588 (Green).

The terpolymers of ethylene, (meth)acrylic acid and alkyl acrylates noted above, form a class of acid copolymers with lower modulus (hence 'soft') and good low temperature properties. A method of preparing these acid copolymers is disclosed in U.S. Pat. No. 4,690,981. While, as noted, they are used as the precursor acid copolymer to form 'soft' ionomers by partial neutralization with metal ions, these acid copolymers with acrylates also find utility in their own right. These acrylate termonomer terpolymer ionomers, whether neutralized with mono- or divalent metals have melt flows at least as good as dipolymer ionomers, thus providing ready processability.

Polyethylenes grafted with a low level of diacid or diacid derivatives, such as maleic acid and its anhydride respectively, are well known for use in adhesives, the maleic acid or anhydride graft being specifically used to enhance adhesivity. According to (REES Chapter 10A) however, with partial neutralization of high density polyethylene grafted with either mono- or dicarboxylic acids to form ionomers, no benefits in mechanical properties were seen, and the main property change was a large reduction in melt flow.

There is a need for ionomers which are thermoplastically processible in the way that conventional ionomers are, but which have improved properties, or which provide a new range of properties when compared with the well known ethylene/monocarboxylic acid/(alkyl acrylate) dipolymer (or terpolymer) ionomers.

SUMMARY OF THE INVENTION

The invention depends on the discovery that when both mono- and dicarboxylic acids (or their derivatives) are copolymerized with ethylene, it is possible to partially neutralize the resins to form ionomers, without producing the type of intractable resin which occurs on neutralization of ethylene/dicarboxylic acid (or derivatives) dipolymers. As a result, the property attributes of 'in-chain' dicarboxylic acid units can thus be realized in melt processible ionomers. These property attributes may be in addition to those present in classic mono-carboxylic acid ionomers if monocarboxylic acid is present in amounts typical of such conventional ionomers. Alternatively, when only relatively low levels of monocarboxylic are present, the ionomerized dicarboxylic acid unit attributes may largely replace the particular attributes of ionomerized monocarboxylic acid units in determining properties which depend on the nature of the polymer chain.

Specifically, the invention is directed to a composition which comprises a partially neutralized precursor acid copolymer, the precursor acid copolymer having in-chain polymerized units derived from the monomers comprising:

(a) ethylene, (b) 2 to 25 weight percent of (meth)acrylic acid, (c) 0.1 to 15 weight percent of a dicarboxylic acid monomer selected from the group consisting of maleic acid, maleic anhydride, a $C_1$–$C_4$-alkyl half ester of maleic acid, fumaric acid, itaconic acid and itaconic anhydride, (d) 0–40 weight percent of a C1–C8-alkyl alkyl acrylate, the ionomer being formed by neutralization of from about 5 to 90 percent of the total number of carboxylic acid units in the copolymer, with metal ions, selected from the group consisting of sodium, magnesium, lithium, zinc, calcium and a mixture of these, with the proviso that the total of (meth)acrylic acid and dicarboxylic acid monomer is from about 4 to about 26 weight percent, and with the further proviso that the total comonomer content not exceed 50 weight percent.

DETAILED DESCRIPTION OF THE INVENTION

In this disclosure the term copolymer is used generically to include polymers containing two, three, or more comonomer units. The term dipolymer or terpolymer, etc., is used when referring to a copolymer having a specific number of comonomers. Following common terminology for copolymers, they are said to 'contain' or 'have' or be 'of' a given comonomer, meaning that the comonomer is copolymerized directly into the chain as comonomer derived units; not, of course, that they actually contain monomer. These are referred to as 'in-chain' units. This is particularly important in the case of the dicarboxylic acid monomer because dicarboxylic acid monomer and particularly maleic anhydride are commonly grafted to polymers. Polymers with grafted comonomer units are quite different in nature and mode of preparation to polymers having the same comonomer in the chain. Such in-chain comonomer copolymers are sometimes referred to as 'direct' copolymers, where all monomers are polymerized together 'directly', rather than graft copolymers where monomers are subsequently polymerized onto an existing polymer chain.

The term 'derivatives' with reference to dicarboxylic acids is used in the sense of mono-esters or anhydrides of those acids. The derivatives themselves form copolymerizable comonomers—not to be confused with the in-chain units 'derived' from a particular comonomer. There will thus be comonomer derived units from comonomers which are derivatives of diacids, such as maleic anhydride, in the polymers.

In referring to percent neutralization of acid units, as claimed, a monocarboxylic acid provides one acid unit, a dicarboxylic acid provides two acid units, an anhydride such as maleic anhydride is considered to provide two acid units, and half esters are considered to provide one acid unit. The calculation of percent neutralization is based on the number of acid units considered to be present as per above, and the number of metal equivalents added. In fact, anhydride units may remain as anhydride units rather than be changed to acid units. When subject to neutralization, an anhydride monomer unit may form a di-metal salt, a mono-metal salt, form an un-neutralized diacid unit, or leave the anhydride unit unaltered as an anhydride unit, acting as if it had no acid functionality. The half esters of diacids, while counted as having only one acid, may actually be converted to diacids or anhydrides, with the various possibilities related to neutralization noted above. As stated however, whatever the number of acid groups (free or neutralized) actually present, the calculated percent neutralization is based on the number of acid units considered to be provided as defined above. In view of the various 'mutations' of the diacid monomers and salts possible, the actual percent of neutralized acid groups as a percent of actual total neutralized and non-neutralized free acid groups may therefore differ from the calculated percent neutralization, which is based on the above assumptions. The difference is due to anhydride units which are not acid units, but are counted as two acid units.

The polymers, containing both dicarboxylic acids or dicarboxylic acid derivatives, and monocarboxylic acid, and optional acrylate monomers, which are the un-neutralized precursor polymers of the ionomers of the present invention will be referred to as 'precursor acid copolymers' or 'precursor ethylene/acid copolymers'. For convenience in general, the word 'ethylene' in ethylene/acid copolymers is understood and usually dropped, referring simply to acid copolymers. The term 'dicarboxylic acid monomer' as used in this disclosure, includes, for description convenience, dicarboxylic acid derivative monomers (half esters and anhydrides). The term 'dicarboxylic acid' used without the qualification 'monomer' does not include dicarboxylic acid derivative monomers.

The monocarboxylic acid monomer in the precursor acid copolymers can be either methacrylic acid, acrylic acid or both. These three possibilities are conveniently referred to in the disclosure by using the term 'ethylene/(meth)acrylic acid copolymers'.

The precursor acid copolymers may also contain up to 40 weight percent of an alkyl acrylate having an alkyl group with from 1 to 8 carbons. This is designated a C1–C8-alkyl alkyl acrylate. If an alkyl acrylate is present, n-butyl acrylate is preferred.

The dicarboxylic acid monomer in the precursor acid copolymers is a dicarboxylic acids or a derivatives of a dicarboxylic acids. Dicarboxylic acid monomers include maleic acid, itaconic acid fumaric acid, and C1–C4-alkyl half esters of these acids, as well as anhydrides of these acids including maleic anhydride and itaconic anhydride. Preferred monomers are maleic anhydride, ethyl hydrogen maleate and methyl hydrogen maleate. Most preferred is maleic anhydride. The carboxylic acid or anhydride units of these monomers are capable of being neutralized with metal ions, just as the monocarboxylic acid carboxylic acid units are, though, as indicated, neutralization of the dicarboxylic acid monomers can be different in its nature and effect on polymer properties, including melt behavior. Dicarboxylic acids can dehydrate to form intrachain anhydride units within the polymer (i.e., within a chain, rather than crosslinking interchain anhydride units).

The ionomers of this invention are partially neutralized acid copolymers, and may contain neutralized and un-neutralized monocarboxylic acid units, neutralized, mono-neutralized and un-neutralized dicarboxylic acid units, and intrachain anhydride units.

The amount of dicarboxylic acid monomer in the precursor acid copolymer is from 0.15 to 15 weight percent, preferably from 0.5 to 10 weight percent. Below 0.15 percent the beneficial properties resulting from this monomer are not realized. At higher dicarboxylic acid monomer levels in the ionomer, properties can reflect the effect of the derived unit as a backbone unit, just as the monocarboxylic acid unit has its effect as a backbone unit. At low levels, particularly at or below about 2 weight percent, the effects of the dicarboxylic acid monomer are still strong, but may depend more on the chemical ability of the monomer to interact with other polymers or substrates (e.g., having an compatibilizing effect or providing improved adhesion) than on its structural effect on the polymer as a backbone unit. Above 15 weight percent dicarboxylic acid monomer, incorporation during polymerization becomes increasingly problematical. A level of 10 weight percent dicarboxylic acid monomer will provide a high level of acid functionality and monomer backbone effect, and corresponding effect on properties.

The amount of monocarboxylic acid is from 2 to 25 weight percent. The presence of monocarboxylic acid, as explained, provides tractability which would not be present in a partially neutralized ethylene/dicarboxylic acid monomer dipolymer, except perhaps at very low levels of neutralization, insufficient to give significant ionomer character to the copolymer. Below 2 weight percent, there is insufficient flow enhancement of the dicarboxylic acid monomer containing terpolymer.

At the higher monocarboxylic acid levels, above about 5 weight percent, there will generally be more monocarboxylic in the polymer than is needed for flow enhancement. Such polymers will be useful where the effects of high amounts of monocarboxylic acid monomer in the backbone are desired. Generally speaking, with high amounts of monocarboxylic acid, above about 8 weight percent, the dicarboxylic acid monomer will be used at relatively low levels, to provide an adhesive or polymer-compatibilizing effect, which results from the monomer or derived anhydride acting as a reactive site. At the other end of the 'spectrum', polymers with high dicarboxylic acid monomer and low monocarboxylic acid may be considered as polymers which can reflect both the backbone and adhesive/compatibilizing effect of the dicarboxylic acid monomer, with sufficient moncarboxylic acid to provide melt flow. Of course, polymers within the two ends of the spectrum (high monocarboxylic acid/low dicarboxylic acid monomer, and low monocarboxylic acid/high dicarboxylic acid monomer) will also find utility; that is to say polymers with moderate levels, from 5 to about 12 weight percent monocarboxylic acid and from 2 to 8 weight percent dicarboxylic acid monomer.

Ease of polymerization becomes more difficult as more total acid is present in the copolymer. This is partly due to polarity differences between the polymer and the monomer mix. The monomer mix, because of reactivity considerations, will have much a much lower proportion of acid monomer than its proportion (as polymer units) in the resulting copolymer. Polarity differences lead to phase separation. As a result polymers with more than about 26 weight percent total acid monomer as not readily prepared. At the low end, at less than 4 weight percent total acid monomer, there is insufficient to provide enough acid monomer in the precursor acid copolymer to give the partially neutralized resin a significant amount of ionomeric character.

The total comonomer content is also limited. While there is an upper limit to each of the comonomers present separately, the total comonomer content will not exceed 50 weight percent. Above 50 weight percent total comonomer, polymerization becomes difficult.

The acid copolymer precursors oft he ionomers of this invention can be prepared by standard free-radical copolymerization methods, using high pressure, operating in a continuous manner. Monomers are fed into the reaction mixture in a proportion which relates to the monomer's reactivity, and the amount desired to be incorporated. In this way, uniform, near-random distribution of monomer units along the chain is achieved. Unreacted monomers may be recycled. Polymerization in this manner is well known, and is described in U.S. Pat. No. 4,351,931 (Armitage), which is hereby incorporated by reference. At high acid levels, it is an advantage to use so-call 'co-solvent' technology to prevent phase separation of monomer and polymer due to high polarity differences of the polymer formed and the monomer mix. The latter, as noted above will contain much less acid monomer than the polymer, because of generally high reactivity of acid monomers. This is fully described in U.S. Pat. No. 5,028,674 (Hatch et al.) and U.S. Pat No. 5,057,593 (Statz), both of which are also hereby incorporated by reference.

While the monocarboxylic acids and dicarboxylic acid monomers may differ somewhat in reactivity, they may be fed together as a mixed solution. The reactivity of the acids is so great compared with ethylene, that all acid is largely converted as it is introduced at the required rate for the amounts of monomer wanted in the polymer.

The acid copolymer precursor polymers of the ionomers of this invention may have a melt index (MI) of from about 2 to 500, preferably 5 to 250, most preferably 20 to 200 grams/10 minutes, as measured using ASTM D-1238, condition E (190° C., 2160 gram weight). Lower MI precursor polymers can not be neutralized to the same extent (percent neutralization) as higher MI polymers having the same acid content, without producing lower flow ionomers. Thus higher metal ion content, and hence more ionomer character, is achievable with higher MI polymers because more neutralization is possible. The same is true with higher total acid content polymers.

The ionomers of the invention may be prepared by standard neutralization techniques, as disclosed in U.S. Pat. No. 3,264,272 (Rees) which is hereby incorporated by reference. The resulting ionomers, the compositions of this invention may have an MI of from 0.01 to 100 grams/10 minutes, preferably 0.1 to 30 grams/10 minutes. The total percent neutralization, as defined in the above paragraphs, is from about 5 to 90 percent, preferably 10 to 70 percent, most preferably between 25 and 60 percent. While lower neutralization levels will provide less ionomer character, higher levels will produce lower flow ionomers. The metal ions used may be any metal ion of group I or group II of the periodic table. In practice however, the preferred metal ions are sodium, zinc, lithium, magnesium, calcium or a mixture of any of these. Most preferred are sodium, zinc, lithium and magnesium.

Above 50 weight percent comonomer, whatever monomers present, polymerization will be difficult.

Because of the large number of variables possible with regard to the composition of this invention, the number of variations within the framework of the claimed invention is very large. Thus the polymers may have varying acid copolymer precursor MI level, and varying levels of each of the monocarboxylic acid and dicarboxylic acid monomer, and each of these may be different monomers. The resulting ionomer may vary in the total percent neutralization, in the particular metal (or metals) used to neutralize, and in the final MI. It is within the skill of the artisan to determine which particular set of composition variables will produce the optimum polymer for his particular needs or application. Nevertheless, there will be certain preferred compositions.

For compositions of the high monocarboxylic acid/low dicarboxylic acid monomer type, it is preferred to have at least 6 weight percent monocarboxylic acid, and more preferred at least 8 weight percent, but for the dicarboxylic acid monomer no more than 3 weight percent, preferably below 2 weight percent, most preferably below 1.5 weight percent. In these types of compositions, the function of the dicarboxylic acid monomer is to provide additional properties to those provided by the monocarboxylic acid/ionomer, such as an increased capacity for compatibility with other polymers. Many of the polymers will remain similar to those of a conventional monocarboxylic acid. Only relatively low levels of the dicarboxylic acid monomer are required to provide the additional properties, and levels as low as 1.0 weight percent, even about 0.5 weight percent dicarboxylic acid monomer, has been found to provide the additional properties.

For compositions of the high dicarboxylic acid monomer/low monocarboxylic acid type, it is preferred to have at least 5 weight percent dicarboxylic acid monomer, and no more than 5 weight percent monocarboxylic acid. As the dicarboxylic acid monomer level increases, the properties of the ionomer become more related to those dependent on in-chain units derived from the dicarboxylic acid monomer. The 5 weight percent monocarboxylic acid will be generally sufficient to provide improved flow over polymers containing only dicarboxylic acid monomer. For higher levels of dicarboxylic acid monomer however, there will generally be need for higher levels of monocarboxylic acid monomer, and/or a lower level of neutralization to ensure adequate melt flow. It will be within the skill of the artisan to determine a suitable balance of adequate monocarboxylic acid and level of neutralization to provide polymers having high dicarboxylic acid monomer units, with adequate melt flow. With sufficient monocarboxylic acid, within the limits stated, the amount of dicarboxylic acid monomer which can be incorporated, and still achieve melt flow is surprisingly high. Up to 15 weight percent dicarboxylic acid monomer will be possible, though this may require neutralization levels in the lower part of the stated range.

While not committing to any particular theory, it is believed the flow enhancement of partially neutralized dicarboxylic acid monomer copolymers which also have monocarboxylic acid present, compared with partially neutralized copolymers which only contain an acid copolymer of the dicarboxylic acid monomer type, may be explained as follows. When a shear force is applied to a partially neutralized acid copolymer melt, tractability is achieved only by breaking up of metal ion clusters which act as crosslinks, so that the metal ion becomes associated with a discrete carboxylic acid group. This may involve metal ions moving from a cluster, to associate with a previously un-neutralized acid group, i.e., exchanging a metal ion and a hydrogen ion. Metal ion/hydrogen ion exchange is believed to be more rapid than metal ion/metal ion exchange, and it may be for this reason that less than complete neutralization is essential to achieve flow, even for copolymers containing only monocarboxylic acid. For dicarboxylic acids, exchange with a remaining hydrogen ion in a dicarboxylic unit may, because of carboxylic acid adjacency, necessitate formation of fully neutralized dicarboxylic acid units adjacent to fully non-neutralized dicarboxylic acid units. This may be a less favored condition because of equilibrium considerations related to the pK of the second acid group when one acid group is neutralized, or it may be some sort of hindrance due to a neighboring acid group effect. Whatever the particular reason however, the presence of a monocarboxylic acid does produce a flow enhancement for a comparable molar amount of total acid and percent neutralization.

In addition to the flow advantage due to the presence of monocarboxylic acid, in ethylene/monocarboxylic acid/dicarboxylic acid monomer ionomers, compared with ionomers based on ethylene/acid copolymers having only dicarboxylic acid monomer, there are other property enhancements. Thus there is an increased ability of the ionomers of the invention to act as a compatibilizing resin, as well as an increased ability for the resin to adhere to various substrates. This is believed to be due to the ability of the dicarboxylic acid to readily form highly reactive in-chain anhydride units, or, because the dicarboxylic acid monomer is an anhydride per se, providing directly such anhydride units. While again not committing to any particular theory, on partial neutralization, it is believed a significant portion of anhydride units can remain un-neutralized, sufficient to provide the various advantages because of their ability to provide further chemical interaction with moieties in other polymers.

EXAMPLES

Test Procedures

Melt Index, (MI) is measured using ASTM D-1238 using a 2160 gram weight, and measured at 190° C.

Melting Point (Tm) was measured using Differential Scanning Calorimetry (DSC), using a Dupont Thermal Analyzer.

Peel Strength was measured as follows. Three-layer blown films were produced in a Killion blown film line. The ionomer layer being tested forms the inner layer between polyethylene (LLDPE) and nylon (6 nylon). Film specimens 1 inch wide and 5 inches long were cut out and then aged for two months at 50% relative humidity. One inch of the nylon outer layer is first peeled from the ionomer layer. (the ionomer layer and polyethylene layer are inseparable). The nylon layer is clamped in the upper jaw of an Instron® tensile tester and the substrate layer in the lower jaw. The specimen is then peeled at a crosshead speed of 12 inches per minute. Data shown in the table (Table 3) represent the average of 5 tests for each material.

Tensile Strength was measured using ASTM D-638 using injection molded bars.

Izod Impact was measured using ASTM D-256 using injection molded specimens. The molded bars were 5 inches long, ½ inch wide and ⅛ inch thick. The bars were cut in half and notches made 1¼ inches from the gate (near gate, listed in table as G) and 3¾ inches from the gate (far from gate, listed in table as F) Because of possible orientation during molding, the impact results can be different for the two locations, as can be seen from the data in Table 4.

Haze, reported as a percent, was measured using ASTM D-1894-63, using hydraulic press molded films having a thickness of 10 mil.

Elmendorf Tear Strength, also using 10 mil. thick press molded specimens, were measured using ASTM D-1922.

Creep tests were performed on press molded film strips 10 mil. thick, ½ inch wide and 8 inches long. The films were hung with a dead load of 100 grams in an oven set at 100° C. The creep time was determined at the time when the load dropped. This procedure was adopted to obtain a guide for boiling water applications, where water may break a seal.

Experimental polymers containing either maleic anhydride or ethyl hydrogen maleate were prepared in a pilot plant unit in the manner described above. The maleic anhydride or ethyl hydrogen maleate was mixed with the methacrylic or acrylic acid, forming a homogeneous solution for feeding to the pilot plant autoclave which was operated at about 240° C. and about 27,000 p.s.i.

Composition of the polymers was determined using infrared absorbance. The methacrylic or acrylic acid content was determined at 940 cm$^{-1}$ and the anhydride content at 1783 cm$^{-1}$. To insure the anhydride forming monomers were converted to anhydride for IR analysis, the pressed film sample was treated at 290° C. for one minute. It is believed that this treatment converts essentially 100% of the monomer to anhydride. The ethyl hydrogen maleate and itaconic acid content shown in Table 1 in the column listing composition by analysis refers to the weight percent, calculated from the weight of the monomer (i.e., calculated in proportion to its molecular weight), based on the weight of anhydride determined by IR.

The acid copolymers were converted to ionomers by reacting with a concentrate containing either sodium carbonate (45 weight percent in an ethylene/methacrylic acid copolymer containing 11 weight percent methacrylic acid and a melt index of 100 grams/10 minutes), or zinc oxide (30 weight percent concentrate in the same acid copolymer), or a mixture of both. The reaction was conducted in a twin screw extruder facilitated by injecting a constant stream of de-ionized water, at a rate corresponding to about 3 percent of the throughput rate of the polymer.

Blends of the ionomers of this invention with other polymers were made either using a twin screw extruder with a mixing screw, using a melt temperature of between 220° and 250° C., or in a Haake Rheocord 90 melt mixer at a temperature of about 230° C. Nylon blends, shown in Table 4 were prepared by extrusion, while the nylon blends in Table 5 were prepared using the Haake mixer. The blends with poly(ethylene glycol) (i.e., polyethylene oxide) were also prepared in a Haake mixer.

Table 1 lists acid precursor polymers made, which were, (or would be suitable to be), neutralized to prepare ionomers of the present invention. Table 2 lists the ionomers of the invention. Tables 3, 4, 5 and 6 show some of the properties of the ionomers of the invention, and some properties of those ionomers blended with nylon or polyethylene oxide. The blends serve to illustrate the utility of the ionomers of the invention as compatibilizers or blending resins. The various utilities are described below.

Table 2 shows the melt index (MI) or melt flow (flow measured at a temperature other than that for standard MI) for resins of the invention. All resins with both monocarboxylic acids and dicarboxylic acid monomers show measurable, and in some cases quite high MI, in contrast to the poor flow reported in the art. In general, zinc neutralized resins show better flow than sodium neutralized resins. Even at 9% analyzed ethyl hydrogen maleate level in the acid precursor polymer flow is possible when a monocarboxylic acid is present (precursor 14, table 1). The sodium neutralized ionomer does not flow particularly well (examples 24 and 25), but the sodium/zinc mixed ion ionomer of this precursor shows excellent flow (example 32). By contrast, a polymer of target composition E/ethyl hydrogen maleate 95/5 (precursor 1C having no monocarboxylic acid present) is totally intractable when neutralized with sodium, zinc or a sodium/zinc blend (examples 2C, 3C and 4C). The latter examples confirm the intractability reported in the art.

Table 3 shows Peel Adhesion when various ionomers of the invention are used to adhere 6-nylon and polyethylene. Film example F-1 through F-4 show that ionomers which contain both monocarboxylic and dicarboxylic acid monomers show better adhesion than ionomers containing only monocarboxylic acid as the sole acid comonomer. Example F-C3 is not an example of the invention since it is an acid copolymer, not an ionomer. However, it also was found to give better adhesion than ionomers based on acid copolymer with monocarboxylic acid the sole acid comonomer.

Table 4 shows that when ionomers of the invention are used to toughen nylon 6, impact resistance, even at −30° C. is far superior than obtained using a comparable amount of conventional monocarboxylic acid ionomer. In these examples, the nylon/ionomer blends contain less than 50 weight percent ionomer.

Table 5 shows a further series of nylon/ionomer blends. In this case however, there is 50 weight percent nylon or less, the nylon being used to increase the creep resistance of the ionomer, rather than, as in the case of toughening above, the ionomer being used to increase the toughness of the nylon. The table shows ionomer of the invention modified with nylon has very significantly less creep than nylon modified conventional monocarboxylic acid ionomer (longer creep time). Blending conventional Surlyn® even with 50% nylon does not improve creep. In addition haze, for blends of the ionomer of the invention with nylon, is much lower than blends with conventional ionomer, even at higher nylon levels.

Table 6 shows the improvement in tear strength which can be achieved by blending certain types of polyethylene oxide (PEO) with ionomers of the invention. Both conventional ionomers and the ionomers of the invention show only minor improvement when blended with high molecular weight polyethylene oxide having hydroxyl end groups, but both ionomers show much greater improvement with a lower molecular weight PEO with a methyl ether end. However with both PEO types, the tear strength improves far more with ionomers of the invention. Ionomers of the invention actually show no improvement in flow with the higher molecular weight polyethylene oxide, actually exhibiting a decreased flow. The high molecular weight PEO causes a large increase in haze for both conventional ionomers and ionomers of the invention. With the methyl ether ended low molecular weight PEO ionomer of the invention however, some improvement in flow was seen, and haze is reduced over either convention ionomer or ionomers of the invention, alone. Clearly low molecular weight methyl ether ended PEO is the PEO of choice, and has a far greater effect on improving tear strength with the ionomer of the invention.

TABLE 1

PRECURSOR ETHYLENE/MONO ACID/DIACID MONOMER COPOLYMERS

| Sample # | Ref. # | Composition (Monomer) | Composition Target Wt. % | Composition* Wt. % by Analysis | MI | Tm °C. |
|---|---|---|---|---|---|---|
| 1 | 40-7A | E/MAA/MAME | 89/10/1 | 88/11/1 | 30 | 99 |
| 2 | 40-7B | E/MAA/MAH | 89/10/1 | 87/12/1 | 30 | 98 |
| 3 | 40-122A | E/MAA/MAH | 89/10/1 | 87/12/1 | 35 | 98 |
| 4 | 77-44A | E/MAA/MAH | 90/9/1 | 87/12/1 | 8.5–11.5 | nm |
| 5 | 40-122D | E/MAA/MAME | 93/5/2 | 90.75/8.5/0.75 | 25 | 103 |
| 6 | 40-122E | E/MAA/MAH | 84/15/1 | 83.5/15.75/.75 | 60 | 93 |
| 7 | 40-122F | E/MAA/MAH | 89.5/10/0.5 | 89.5/10/0.5 | 10 | 101 |
| 8 | 73-123A | E/MAA/NBA/MAH | 69/8/23/1 | 73.25/7/19/.75 | 50 | nm |
| 9 | 39-9B | E/AA/MAME | 85/10/5 | 82.5/13.5/4 | 200 | 92 |
| 10 | 39-9C | E/AA/MAH | 87/10/3 | 81/17/2 | 200 | 91 |
| 11 | 39-23A | E/AA/MAH | 87/10/3 | 83.5/14.25/2.25 | 180 | 92 |
| 12 | 39-65A | E/MAA/MAME | 88/10/2 | 86.5/12/1.5 | 30 | 99 |
| 13 | 39-65B | E/AA/MAME | 93/5/2 | 92/6.5/1.5 | 12 | 103 |
| 14 | 39-65C | E/AA/MAME | 80/10/10 | 77.25/13.75/9 | 200 | 90 |
| 15 | 44-57A | E/MAA/IBA/MAME | 79/10/10/1 | 80.5/8/10.5/1 | 20–40 | 88 |
| 16 | 44-57D | E/MAA/ITA | 89/10/1 | 89/10.5/.5 | 20–40 | 99 |
| 17 | 40-122C | E/MAA/MAH | 93/6/1 | 93.9/5.7/.4 | 40–60 | 103 |
| 1C | 46-60 | E/MAME | 95/5 | nm | 40–60 | 108 |

E = Ethylene; MAA = Methacrylic acid; AA = Acrylica cid; ITA = Itaconic acid; MAH = Maleic anhydride; MAME = Ethyl hydrogen maleate (Maleci Acid Monoethyl Ester). IBA = iso-Butyl acrylate; NBA = n-Butyl acrylate. MI = Melt Index,
*Rounded to nearest 0.25% except sample 17 with very low MAH.
nm = not measured.
Ref. #, An experimental notebook reference number used for ease of cross-reference. Sample 190 , number of precursor polymer
Example # Example number of a composition which relates to a composition which is part of the invention. Compositions shown had a targeted monomer content. Content determined by analysis is shown i the following column.

TABLE 2

IONOMERS FROM PRECURSORS POLYMERS

| Example # | Ref. # | Precursor Sample # | Cation | % Neutr. | MI Prec. | MI | Resin Appearance | Wt. % anhydride |
|---|---|---|---|---|---|---|---|---|
| 1 | 61-104-2 | 2 | Na | 22.5 | 30 | 3.2 | transparent | 0.36 |
| 2 | 61-104-3 | 2 | Na | 37.5 | 30 | 0.81 | transparent | 0.23 |
| 3 | 61-104-4 | 1 | Na | 22.5 | 30 | 22.6 | transparent | 0.18 |
| 1C | 61-143-1 | Nucrel ® 1035 | Zn | 45 | 35 | 2.0 | tranparent | nm |
| 4 | 61-143-2 | 2 | Zn | 45 | 30 | 2.0 | transparent | 0.41 |
| 5 | 61-143-3 | 2 | Zn | 70 | 30 | 0.45 | transparent | 0.19 |
| 6 | 61-143-4 | 1 | Zn | 45 | 30 | 1.15 | transparent | nm |
| 7 | 61-143-5 | 1 | Zn | 70 | 30 | 0.37 | transparent | nm |
| 8 | 76-97-1 | 3 | Na | 37.5 | 35 | 2.12 | transparent | nm |
| 9 | 76-97-2 | 17 | Na | 37.5 | 40–60 | 0.9 | slight opaque | nm |
| 10 | 76-97-3 | 5 | Na | 37.5 | 25 | 1.34 | slight opaque | nm |
| 11 | 76-63-1 | 8 | Zn | 50 | 50 | 1.5 | transparent | nm |
| 12 | 87-1-4 | 8 | Na/Zn | 50 | 50 | 3.53 | transparent | nm |
| 13 | 87-120-7 | 6 | Zn | 50 | 60 | 1.2 | transparent | nm |
| 14 | 87-120-8 | 6 | Na/Zn | 50 | 60 | 1.0 | transparent | nm |
| 15 | 40-6-1 | 12 | Na | 40 | 30 | zero | slight opaque | nm |
| 16 | 40-6-2 | 12 | Zn | 40 | 30 | 0.41 | slight opaque | nm |
| 17 | 40-6-3 | 10 | Na | 40 | 200 | 7.1 | transparent | nm |
| 18 | 40-46-1 | 12 | Na | 40 | 30 | 0.05 | slight opaque | nm |
| 19 | 40-46-2 | 12 | Zn | 40 | 30 | 0.65 | slight opaque | nm |
| 20 | 40-125-1 | 11 | Na | 40 | 180 | 10.3 | transparent | nm |
| 21 | 40-125-2 | 5 | Na | 45 | 25 | 0.36* | slight opaque | nm |
| 22 | 40-125-3 | 13 | Na | 40 | 12 | 0.49* | transparent | nm |
| 23 | 40-125-4 | 9 | Na | 40 | 200 | 0.3 | transparent | nm |
| 24 | 40-125-4 | 14 | Na | 30 | 200 | 0.02* | transparent | nm |
| 25 | 40-125-6 | 14 | Na | 50 | 200 | .015* | transparent | nm |
| 26 | 40-137-1 | 9 | Zn | 40 | 200 | 3.8 | slight opaque | nm |
| 27 | 40-137-2 | 10 | Zn | 50 | 200 | 4.6 | slight opaque | nm |

TABLE 2-continued

IONOMERS FROM PRECURSORS POLYMERS

| Example # | Ref. # | Precursor Sample # | Cation | % Neutr. | MI Prec. | MI | Resin Appearance | Wt. % anhydride |
|---|---|---|---|---|---|---|---|---|
| 28 | 40-137-3 | 13 | Zn | 50 | 12 | 0.7 | slight opaque | nm |
| 29 | 40-137-4 | 14 | Zn | 32 | 200 | 4.1 | transparent | nm |
| 30 | 40-137-5 | 12 | Na/Zn | 40 | 30 | 0.9 | transparent | nm |
| 31 | 40-137-6 | 9 | Na/Zn | 40 | 200 | 6.3 | transparent | nm |
| 32 | 40-137-7 | 14 | Na/Zn | 32 | 200 | 12.8 | transparent | nm |
| 33 | 44-57A | 15 | Zn | 50 | 20–40 | 0.42 | slight opaque | nm |
| 34 | 40-143-4 | 16 | Zn | 50 | 20–40 | 0.86 | slight opaque | nm |
| 2C | 27-70-1 | 1C | Na | 60 | 40–60 | xlink | — | — |
| 3C | 37-70-2 | 1C | Na/Zn | 60 | 40–60 | xlink | — | — |
| 4C | 27-70-3 | 1C | Zn | 60 | 40–60 | xlink | — | — |

MI Prec. MI of the Precursor Polymer.
xkink = crosslinked in extruder, MI could not be measured.
*measured at 240° C.
Neutralization with mixed Na/Zn ions used equal percent neutralization with each ion.

TABLE 3

PEEL ADHESION OF DICARBOXYLIC ACID MONOMER CONTAINING IONOMERS BETWEEN NYLON AND POLYETHYLENE.

| Film Ex. # | Film Ref. # | Ionomer or Acid copolymer or Ref. # | Polymer type | Thickness (mils) (Nylon/Ionomer/PE) | Peel Strength (lbs/inch) |
|---|---|---|---|---|---|
| F-C1 | 61-153-1 | Surlyn ® 1650 | monocarboxylic acid ionomer | 1.4/0.7/1/3 | 1.6 |
| F-C2 | 61-153-2 | 45% Zn neutrlz. Nucrel ® 1035 | monocarboxylic acid ionomer | 1.5/0.6/1.3 | 1.1 |
| F-1 | 61-153-3 | 61-143-2 (see table 2) | mono/dicarboxylic acid ionomer | 1.3/0.6/1.2 | 2.2 |
| F-2 | 61-153-4 | 61-143-3 (see table 2) | mono/dicarboxylic acid ionomer | 1.5/0.6/1.5 | 2.3 |
| F-3 | 61-153-5 | 61-143-4 (see table 2) | mono/dicarboxylic acid ionomer | 1.3/0.5/1.2 | 2.3 |
| F-4 | 61-153-6 | 61-143-5 (see table 2) | mono/dicarboxylic acid ionomer | 1.5/0.5/1.4 | 2.4 |
| F-C3 | 61-153-7 | 40-7B | mono/dicarboxylic acid ionomer | 1.2/0.6/1/2 | 2.3 |

Nylon is 6 nylon, PE is LLDPE. All ionomers are zinc neutralized (see table 2).
Film Ref. # is for notebook cross-reference identification.
Nucrel ® 1035 is E/MAA (90/10) by weight.
Surlyn ® 1650 is E/MAA 88/12
% by weight, 38% zinc neutralized.

TABLE 4

TOUGHENING 6-NYLON WITH IONOMERS (<50% IONOMER)

| Blend Ex. # | % Ionomer or Acid Copol. in blend | Ionomer or precursor acid copolymer. | % Netralizn./ metal | Tensile Strength (kpsi) Room temp. | 150° C. | Izod Impact (ft-lb./in.) @ -20° C. G/F | @ -30° C. G/F |
|---|---|---|---|---|---|---|---|
| B-C1 | 40 | Surlyn ® 1554 | 70 | 8.2 | 2.1 | 2.3/2.9 | 1.8/2.9 |
| B-C2 | 45 | Surlyn ® 1554 | 70 | 8.3 | 1.8 | 2.8/3.7 | 2.5/3.1 |
| B-C3 | 40 | Surlyn ® 1776 | 60 | 7.2 | 2.0 | 2.6/3.3 | 2.3/2.9 |
| B-C4 | 45 | Surlyn ® 1776 | 60 | 7.7 | 1.7 | 16.4/18.3 | 3.1/8.9 |
| B-1 | 40 | 4 (see table 1) | 70/Zn | 8.7 | 2.3 | 23.0/23.1 | 14.0/2.5 |
| B-2 | 45 | 7 (see table 1) | 65/Zn | 8.5 | 1.7 | 25.0/25.0 | 23.0/23.0 |
| B-3 | 40 | 7 (see table 1) | 70/Zn | 8.2 | 2.1 | 22.0/22.0 | 17.8/18.9 |
| B-4 | 45 | 7 (see table 1) | 65/Zn | 8.1 | 1.9 | 24.0/25.0 | 19.6/21.5 |

Surlyn ® 1554 is E/MAA 90/10 by weight, Zn neutr.
Surlyn ® 1776 is E/MAA 85/15 by weight, Zn neutralized.

TABLE 5

HIGH TEMPERATURE CREEP RESISTANCE OF IONOMER/NYLON BLENDS (=/>50% IONOMER)

| Blend Example # | Ionomer | Wt. % Nylon | Haze (%) | Creep, Time @ 100° C. (minutes) |
|---|---|---|---|---|
| B-C5 | Surlyn ® 1601 | 0 | | 2.5 |
| B-C6 | Surlyn ® 1706 | 40 | 15.1 | 2 |
| B-C7 | Surlyn ® 1706 | 50 | 23.6 | 2 |
| B-C8 | Surlyn ® 9220 | 40 | 8.0 | 2 |
| B-C9 | Surlyn ® 9220 | 50 | 14.1 | 2 |
| B-5 | Ex. 4/table 2 | 50 | 8.6 | >60 |
| B-6 | Ex. 4/table 2 | 30 | 7.0 | 10 |

Nylon is 6 nylon
Surlyn® 1706 is E/MAA (85/15 by weight) neutralized 60% with zinc.
Surlyn® 9220 is E/MAA (80/20) neutr. with zinc.

TABLE 6

IONOMERS PLASTICIZED WITH POLY(ETHYLENE OXIDE)

| Blend Example # | Ionomer | PEO composition | Weight % PEO | MI | Haze % | Elmendorf Tear Strength (g./mil) |
|---|---|---|---|---|---|---|
| B-C10 | Surlyn ® 1601 | — | 0 | 1.3 | 2 | 57 |
| B-C11 | 61-104-3 (table 2) | — | 0 | 0.8 | 3.5 | 60 |
| B-C12 | Surlyn ® 1601 | Mol. Wt. 4600 | 10 | 2.3 | 25 | 73 |
| B-C13 | Surlyn ® 1601 | Mol. Wt 350 ME | 10 | 6.1 | 1.5 | 287 |
| B-7 | 61-104-3 | Mol. Wt 4600 | 10 | 0.4 | 26 | 108 |
| B-8 | 61-104-3 | Mol. Wt. 350 ME | 10 | 2.5 | 1.8 | No tear |

Surlyn® 1601 is E/MAA 90/10, 58% Na neutralized. Polyethylene oxides (PEO) were one of molecular weight 4600 with no etherification on the end groups and one of 350 molecular weight with a methyl ether (ME) end group.

I claim:

1. A composition which comprises an ionomer, formed from a partially neutralized acid copolymer precursor, the acid copolymer precursor having polymerized in-chain units derived from the monomers comprising:

(a) ethylene, (b) 2 to 25 weight percent of (meth)acrylic acid, (c) 0.1 to 15 weight percent of a dicarboxylic acid monomer selected from the group consisting of maleic acid, fumaric acid, itaconic acid, maleic anhydride, itaconic anhydride, a $C_1$–$C_4$-alkyl alkyl half ester of maleic acid, and a mixture of these dicarboxylic acid monomers, (d) 0–40 weight percent of a $C_1$–$C_8$-alkyl alkyl acrylate, the ionomer being formed by neutralization of from about 5 to 90 percent of the total number of carboxylic acid units in the copolymer, with metal ions, selected from the group consisting of sodium, zinc, lithium, magnesium, calcium, and a mixture of any of these, with the proviso that the total of (meth)acrylic acid and dicarboxylic acid monomer is from 4 to 26 weight percent of the acid copolymer precursor, and with the further proviso that the total comonomer content not exceed 50 weight percent of the acid copolymer precursor, the ionomer having a melt index of from 0.01 to 100 grams/10 minutes.

2. The ionomer composition of claim 1 wherein the melt index is from 0.1 to 30 grams/10 minutes and the neutralization level is from 10 to 70 percent.

3. The composition of claim 1 wherein the monocarboxylic acid content of the acid copolymer precursor is at least 8 weight percent and the dicarboxylic acid monomer content is no more than 3 weight percent.

4. The composition of claim 3 wherein the dicarboxylic acid monomer content is no more than 1.5 weight percent.

5. The composition of claim 1 wherein the dicarboxylic acid monomer content is at least 5 weight percent, and the total monocarboxylic acid is no more than 10 weight percent.

* * * * *